(12) United States Patent
Aoki et al.

(10) Patent No.: US 12,658,951 B2
(45) Date of Patent: Jun. 16, 2026

(54) COMMUNICATION DEVICE AND METHOD FOR OPERATING SAME

(71) Applicant: SAMSUNG ELECTRONICS CO., LTD., Suwon-si (KR)

(72) Inventors: Yuichi Aoki, Suwon-si (KR); Heedo Kang, Suwon-si (KR); Yonghoon Kim, Suwon-si (KR); Wonki Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 18/230,899

(22) Filed: Aug. 7, 2023

(65) Prior Publication Data

US 2023/0378985 A1     Nov. 23, 2023

Related U.S. Application Data

(63) Continuation of application No. PCT/KR2022/001194, filed on Jan. 24, 2022.

(30) Foreign Application Priority Data

Mar. 16, 2021   (KR) ........................ 10-2021-0033895

(51) Int. Cl.
*H04B 1/04* (2006.01)
*H04B 1/00* (2006.01)
(52) U.S. Cl.
CPC ......... *H04B 1/0475* (2013.01); *H04B 1/0028* (2013.01); *H04B 2001/0425* (2013.01)
(58) Field of Classification Search
CPC ............... H04B 1/0475; H04B 1/0028; H04B 2001/0425; H04B 1/62; H03F 2200/451;
(Continued)

(56) References Cited

U.S. PATENT DOCUMENTS

| | | | |
|---|---|---|---|
| 7,136,628 B2 | 11/2006 | Yang et al. | |
| 7,783,263 B2 * | 8/2010 | Sperlich | H04L 5/1469 |
| | | | 370/278 |

(Continued)

FOREIGN PATENT DOCUMENTS

| | | |
|---|---|---|
| CN | 106034095 B | 4/2019 |
| EP | 2 775 681 B1 | 6/2017 |

(Continued)

OTHER PUBLICATIONS

Communication dated Apr. 26, 2022, issued by the International Searching Authority in counterpart International Application No. PCT/KR2022/001194 (PCT/ISA/210).

(Continued)

*Primary Examiner* — Emmanuel Bayard
(74) *Attorney, Agent, or Firm* — Sughrue Mion, PLLC

(57) ABSTRACT

A communication device includes a transmitter that, in a first operation, distorts an input signal through a digital predistortion unit, converts the distorted input signal into an analog signal, performs frequency up-conversion on the converted analog signal to generate a first signal, amplifies the generated first signal through a power amplifier, and couples the amplified first signal; a receiver that, in the first operation, receives the coupled first signal from the transmitter, performs frequency down-conversion on the coupled first signal so as to generate a second signal, and converts the generated second signal into a digital signal through one or more analog-to-digital converters that are turned on, among a plurality of analog-to-digital converters; and a processor that, in the first operation, causes one or more of the plurality of analog-to-digital converters to be turned on and a remainder of the plurality of analog-to-digital converters to be turned off.

15 Claims, 13 Drawing Sheets

(58) Field of Classification Search
CPC .......... H03F 3/189; H03F 3/68; H03F 1/3247; H03F 1/3241; H03M 1/1215; H03M 1/121; H04W 52/0251; H04W 52/028; Y02D 30/70
USPC .................................................. 375/295–297
See application file for complete search history.

(56) References Cited

U.S. PATENT DOCUMENTS

| | | | |
|---|---|---|---|
| 8,750,410 B2 | 6/2014 | Gandhi et al. | |
| 8,912,848 B2 | 12/2014 | Lee et al. | |
| 2008/0146168 A1* | 6/2008 | Jesson | H03F 1/3282 |
| | | | 455/114.3 |
| 2010/0297966 A1* | 11/2010 | Row | H03F 1/3241 |
| | | | 455/114.3 |
| 2011/0316623 A1* | 12/2011 | Bohn | H03F 1/0227 |
| | | | 330/127 |
| 2015/0092880 A1* | 4/2015 | Johansson | H03F 1/3241 |
| | | | 375/295 |
| 2017/0117854 A1* | 4/2017 | Ben Smida | H03F 3/24 |
| 2020/0028476 A1* | 1/2020 | Kim | H04B 1/0475 |
| 2020/0118498 A1* | 4/2020 | Lee | G09G 5/39 |
| 2021/0391853 A1* | 12/2021 | Jann | H03B 5/12 |

FOREIGN PATENT DOCUMENTS

| | | |
|---|---|---|
| KR | 10-2009-0029351 A | 3/2009 |
| KR | 10-2010-0042243 A | 4/2010 |
| KR | 10-2014-0112412 A | 9/2014 |
| KR | 10-1697752 B1 | 1/2017 |
| KR | 10-2011161 B1 | 8/2019 |
| KR | 10-2024485 B1 | 9/2019 |
| KR | 10-2020-0010475 A | 1/2020 |

OTHER PUBLICATIONS

Communication dated Apr. 26, 2022, issued by the International Searching Authority in counterpart International Application No. PCT/KR2022/001194 (PCT/ISA/237).

Morgan et al., "A Generalized Memory Polynomial Model for Digital Predistortion of RF Power Amplifiers," IEEE Transactions on Signal Processing, vol. 54, No. 10, pp. 3852-3860, Oct. 2006.

Aoki et al., "Inter-Stream Loopback Calibration for 5G Phased-Array Systems," 2020 IEEE Radio Frequency Integrated Circuits Symposium, RTu2B-5, pp. 359-362, 2020.

Yousry, Ramy & Chen, Ming-Shuan & Chang, Mau-Chung Frank & Yang, Chih-Kong, (2013), "An architecture-reconfigurable 3b-to-7b 4GS/s-to-1.5GS/s ADC using subtractor interleaving", Proceedings of the 2013 IEEE Asian Solid-State Circuits Conference, A-SSCC 2013, pp. 285-288, doi: 10.1109/ASSCC.2013.6691038.

European Extended Search Report issued Jun. 14, 2024 by the European Patent Office for EP Patent Application No. 22771592.7.

Office Action dated Mar. 11, 2025, issued by Korean Patent Office in Korean Patent Application No. 10-2021-0033895.

Notice of Allowance dated Nov. 18, 2025, issued by Korean Patent Office in Korean Patent Application No. 10-2021-0033895.

* cited by examiner

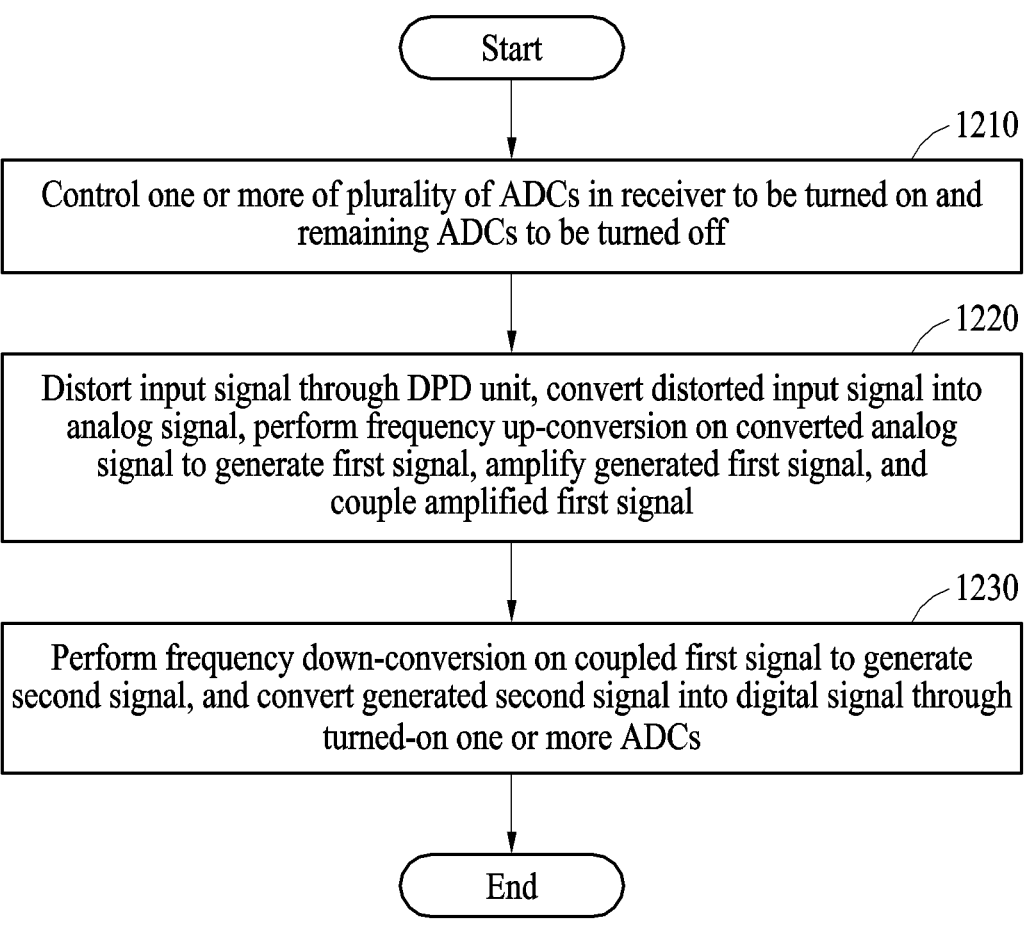

Start

1210

Control one or more of plurality of ADCs in receiver to be turned on and remaining ADCs to be turned off

1220

Distort input signal through DPD unit, convert distorted input signal into analog signal, perform frequency up-conversion on converted analog signal to generate first signal, amplify generated first signal, and couple amplified first signal

1230

Perform frequency down-conversion on coupled first signal to generate second signal, and convert generated second signal into digital signal through turned-on one or more ADCs End

FIG. 12

COMMUNICATION DEVICE AND METHOD FOR OPERATING SAME

CROSS-REFERENCE TO RELATED APPLICATIONS

This application is a bypass continuation application of International Patent Application No. PCT/KR2022/001194, filed on Jan. 24, 2022, which is based on and claims priority to Korean Patent Application No. 10-2021-0033895, filed on Mar. 16, 2021 with the Korean Intellectual Property Office, the disclosures of each of which are incorporated by reference herein in their entireties.

BACKGROUND

1. Field

The following disclosure relates to a communication device.

2. Description of Related Art

A power amplifier (PA) used for a radio frequency (RF) end in a wireless communication system may have nonlinear characteristics. To compensate for such nonlinear characteristics, digital predistortion (DPD) may be performed on a signal before the signal is input to the PA. By DPD, an output signal of the PA may have linear characteristics.

Meanwhile, a communication device may include a receiver, and the receiver may include a plurality of analog-to-digital converters (ADCs) operating at high speed. When a DPD parameter is updated, the receiver may operate as an observation receiver. When the receiver operates as an observation receiver, all the ADCs may operate at high speed, consuming a lot of power.

SUMMARY

According to various embodiments, provided may be a communication device for using a receiver as an observation receiver when updating a digital predistortion (DPD) parameter while achieving power saving by turning on one or more of analog-to-digital converters (ADCs) in the receiver and turning off the remaining ADCs.

According to various embodiments, provided may be a communication device that includes an observation receiver distinct from a receiver and is capable of high-speed processing through ADCs in the observation receiver.

A communication device according to various embodiments may include a transmitter configured to, in a first operation, distort an input signal through a DPD unit, convert the distorted input signal into an analog signal, perform frequency up-conversion on the converted analog signal to generate a first signal, amplify the generated first signal through a power amplifier (PA), and couple the amplified first signal; a receiver configured to, in the first operation, receive the coupled first signal from the transmitter, perform frequency down-conversion on the coupled first signal to generate a second signal, and convert the generated second signal into a digital signal through one or more ADCs that are turned on among a plurality of ADCs; and a processor configured to, in the first operation, cause one or more of the plurality of ADCs in the receiver to be turned on and a remainder of the plurality of ADCs to be turned off.

A communication device according to various embodiments may include a transmitter configured to, in a first operation, distort an input signal through a DPD unit, convert the distorted input signal into an analog signal, perform frequency up-conversion on the converted analog signal to generate a first signal, amplify the generated first signal, and transmit the amplified first signal to a first receiver through one or more antennas or one or more couplers; the first receiver configured to, in the first operation, perform frequency down-conversion on the received first signal to generate a second signal, convert the generated second signal into a digital signal through an ADC, and transmit the converted digital signal to a processor, wherein the first receiver is deactivated in a second operation; a second receiver configured to receive a signal through the one or more antennas in the second operation; and a processor coupled with the first receiver and the second receiver. A sampling time of the ADC may be less than a time calculated using a transmission signal bandwidth of the transmitter and a predetermined value.

An operating method of a communication device according to various embodiments may include causing one or more of a plurality of ADCs in a receiver to be turned on and a remainder of the plurality of ADCs to be turned off; distorting an input signal through a DPD unit; converting the distorted input signal into an analog signal; performing frequency up-conversion on the converted analog signal to generate a first signal; amplifying the generated first signal through a PA; coupling the amplified first signal; performing frequency down-conversion on the coupled first signal to generate a second signal; and converting the generated second signal into a digital signal through the turned-on one or more ADCs.

According to various embodiments, it is possible to use a receiver as an observation receiver when updating a digital predistortion (DPD) parameter while achieving power saving by turning on one or more of analog-to-digital converters (ADCs) in the receiver and turning off the remaining ADCs.

According to various embodiments, a wideband ADC in an observation receiver distinct from a receiver may be inexpensive and more cost-effective, operate at high speed, and be capable of high-speed processing when updating a DPD parameter.

In addition, various effects directly or indirectly ascertained through the present disclosure may be provided.

BRIEF DESCRIPTION OF THE DRAWINGS

The above and other aspects and features of certain embodiments of the present disclosure will be more apparent from the following description taken in conjunction with the accompanying drawings, in which:

FIG. 12 is a flowchart illustrating an operating method of a communication device according to various embodiments.

DETAILED DESCRIPTION

Figure 1:
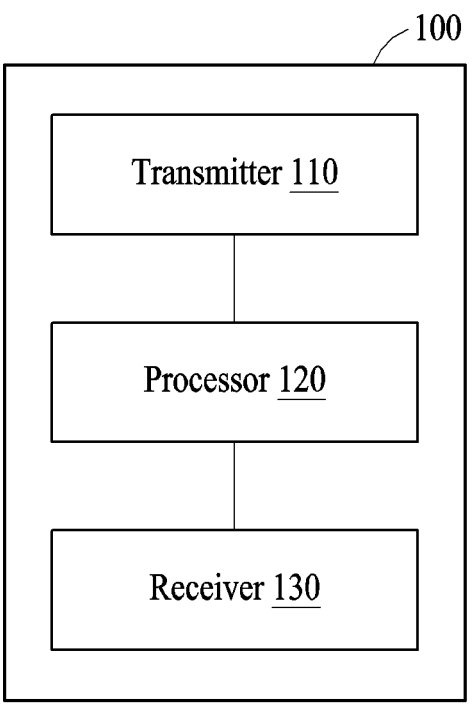
FIG. 1 is an exemplary diagram illustrating a communication device according to various embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is an exemplary diagram illustrating a communication device according to various embodiments.

Referring to FIG. 1, a communication device 100 may include a transmitter 110, a processor 120, and a receiver 130.

According to an embodiment, the communication device 100 may be included in an electronic device (e.g., a smartphone or a tablet personal computer (PC)) and may communicate with an external device (e.g., a base station device). According to another embodiment, the communication device 100 may be included in a base station device (e.g., a radio unit (RU)) and may communicate with an external device (e.g., an electronic device such as a mobile terminal).

According to an embodiment, the communication device 100 may perform communication using a time division duplex (TDD) scheme. According to another embodiment, the communication device 100 may perform communication using a frequency division duplex (FDD) scheme. According to still another embodiment, the communication device 100 may perform communication using a scheme in which the TDD scheme and the FDD scheme are combined.

According to an embodiment, the transmitter 110 may receive a baseband signal (e.g., a baseband digital in-phase (I) quadrature-phase (Q) stream) from a modem (not shown), convert the received baseband signal into a radio frequency (RF) signal, and transmit the RF signal to an external device through an antenna.

According to an embodiment, the receiver 130 may convert the RF signal received through an antenna into the baseband signal and transmit the baseband signal to a modem.

The processor 120 may control the communication device 100 overall.

According to an embodiment, the processor 120 may perform a digital predistortion (DPD) parameter update operation. In the DPD parameter update operation, the processor 120 may cause a portion of a plurality of analog-to-digital converters (ADCs) in the receiver 130 to be turned on and the remaining ADCs in the receiver 130 to be turned off. This will be described later with reference to FIGS. 5 to 7.

Figure 2:
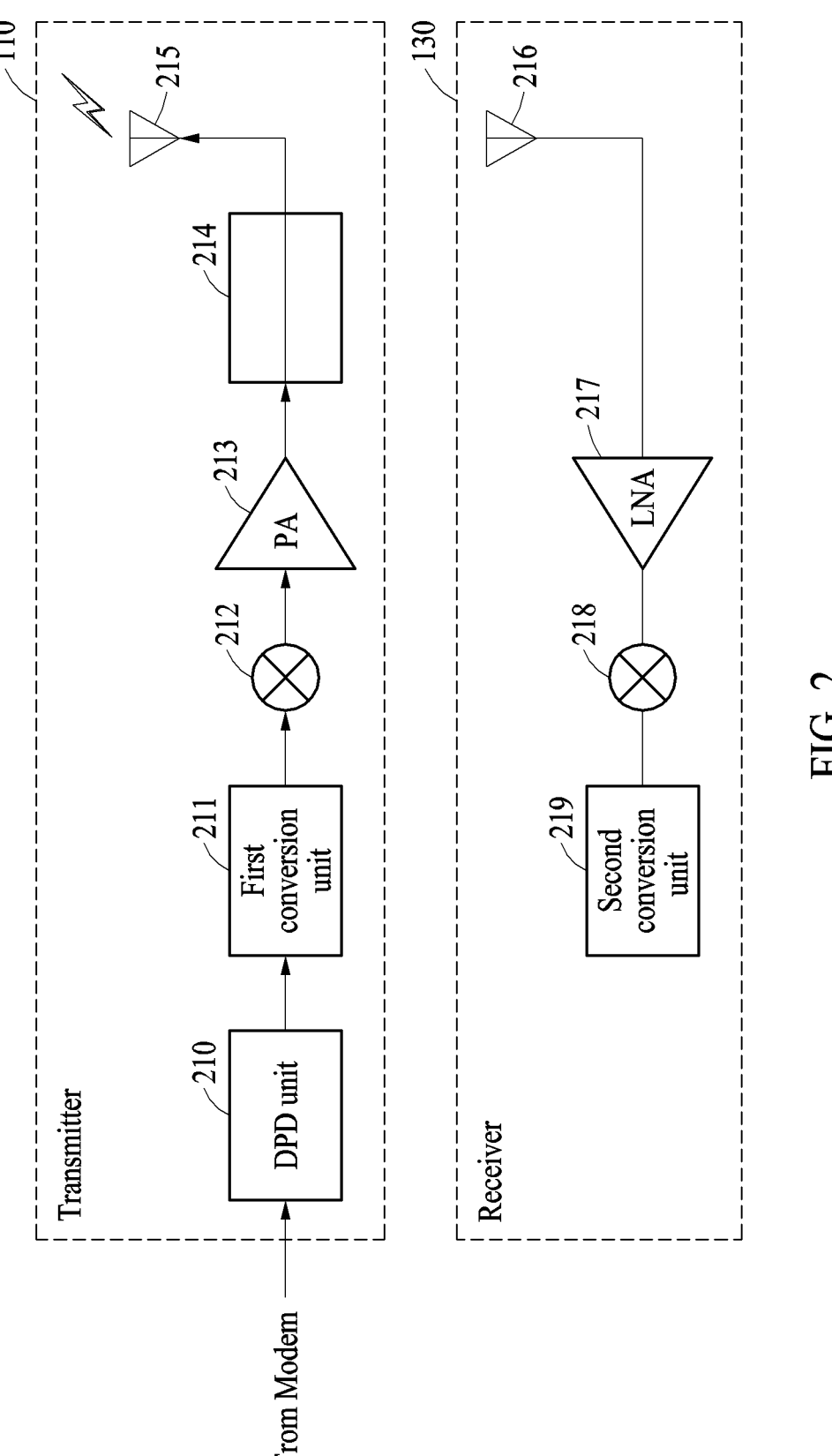
FIG. 2 is an exemplary diagram illustrating a transmission operation of a communication device according to various embodiments.

FIG. 2 is an exemplary diagram illustrating a transmission operation of a communication device according to various embodiments.

Referring to FIG. 2, the transmitter 110 may include a DPD unit 210, a first conversion unit 211, an upconverter 212, a power amplifier (PA) 213, a coupler 214, and a transmission antenna 215.

The receiver 130 may include a reception antenna 216, a low-noise amplifier (LNA) 217, a downconverter 218, and a second conversion unit 219.

In the example shown in FIG. 2, the transmission antenna 215 and the reception antenna 216 may be the same antenna. In other words, an antenna may operate as the transmission antenna 215 for transmitting an RF signal to the outside in a transmission operation and may operate as the reception antenna 216 for receiving an RF signal in a reception operation. In the transmission operation, the PA 213 and the antenna may be electrically connected through a TX/RX switch (not shown), so that the antenna may operate as the transmission antenna 215. In the reception operation, the LNA 217 and the antenna may be electrically connected through a TX/RX switch (not shown), so that the antenna may operate as the reception antenna 216. Depending on the implementation, the transmission antenna 215 and the reception antenna 216 may be physically distinct.

An example of the operation of the communication device 100 in the transmission operation is shown in FIG. 2. The communication device 100 may perform the reception operation, and an example of the reception operation will be described with reference to FIG. 3.

In the example shown in FIG. 2, the DPD unit 210 may distort an input signal (e.g., a baseband signal from a modem). This distortion may be performed before the amplification operation of the PA 213 and may thus be referred to as "predistortion". The distorted input signal may be input to the first conversion unit 211.

The first conversion unit 211 may include one or more digital-to-analog converters (DACs). The first conversion unit 211 may convert the distorted input signal into an analog signal.

The upconverter 212 may generate an RF signal by performing frequency up-conversion on the converted analog signal. The RF signal may be input to the PA 213.

The PA 213 may amplify the power of the generated RF signal.

In the transmission operation, the coupler 214 may not couple the amplified RF signal and may transmit the amplified RF signal to the transmission antenna 215.

The transmission antenna 215 may transmit the amplified RF signal to an external device.

Figure 3:
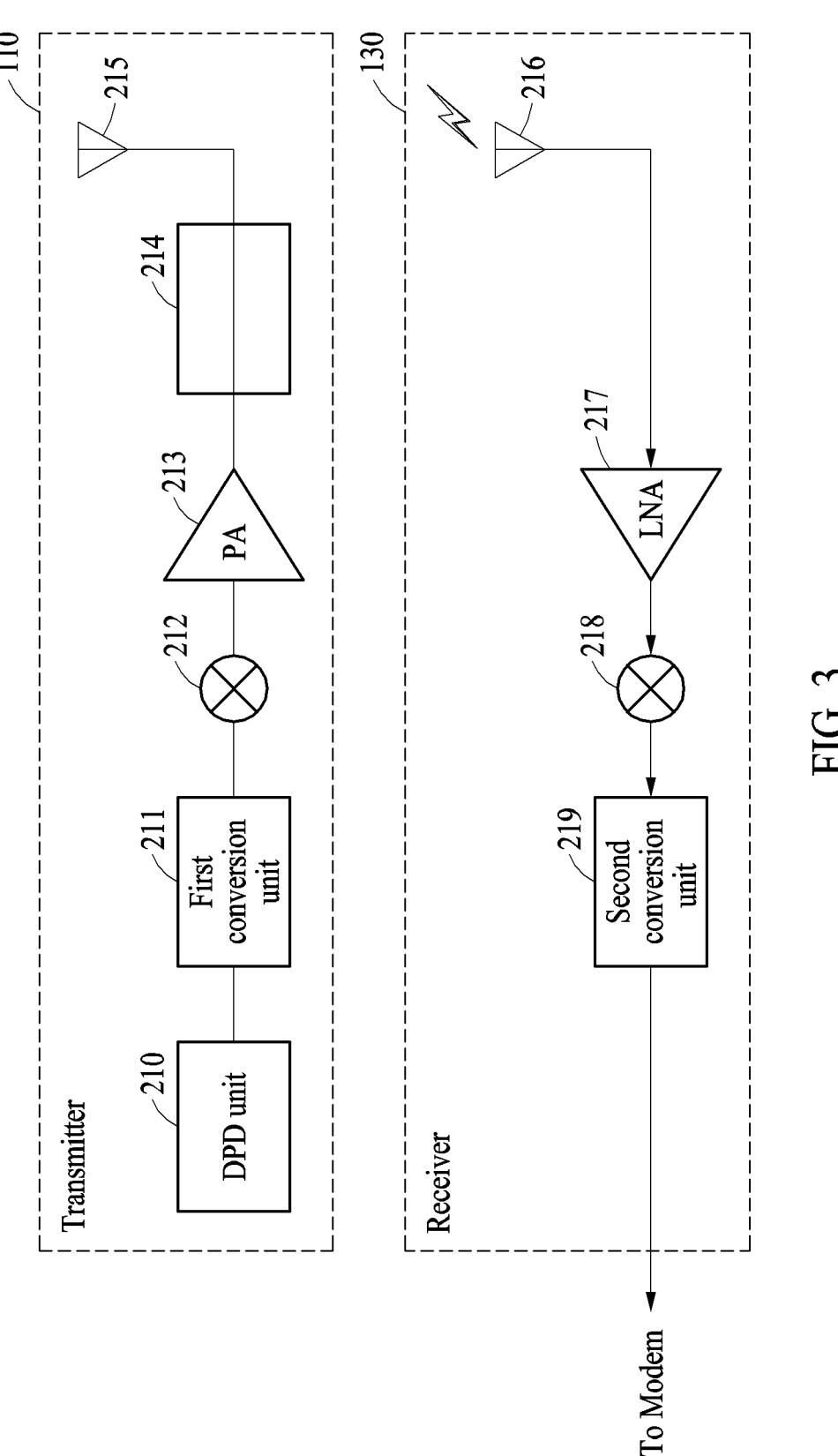
FIGS. 3 and 4 are exemplary diagrams illustrating a reception operation of a communication device according to various embodiments.
Figure 4:
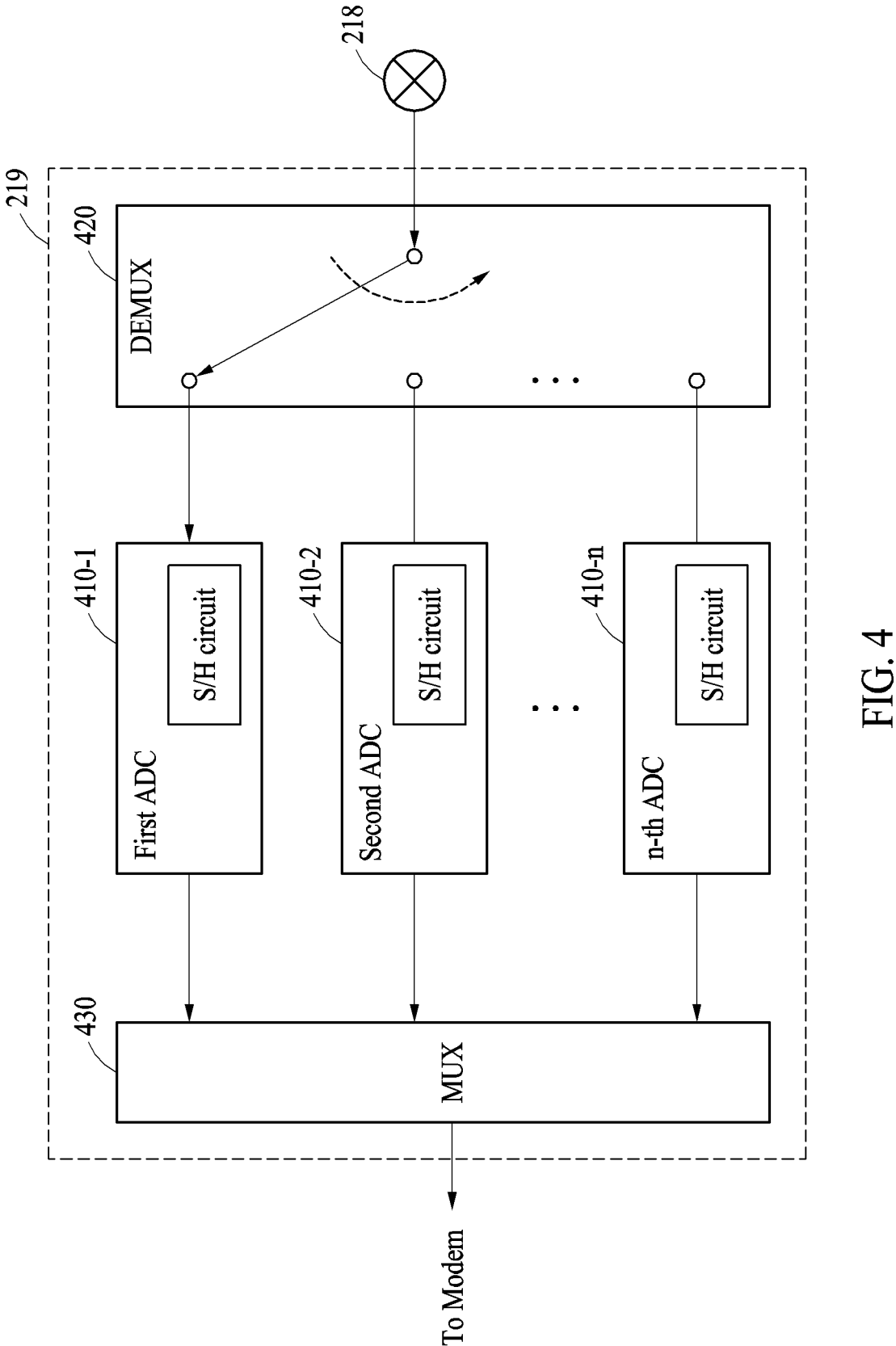

FIGS. 3 and 4 are exemplary diagrams illustrating a reception operation of a communication device according to various embodiments.

In the example shown in FIG. 3, the reception antenna 216 may receive an RF signal from an external device.

The LNA 217 may amplify the received RF signal and may remove or minimize the noise in the received RF signal. An output signal of the LNA 217 may be input to the downconverter 218.

The downconverter 218 may perform frequency down-conversion on the output signal of the LNA 217. An output signal of the downconverter 218 may be input to the second conversion unit 219.

The second conversion unit 219 may include one or more ADCs. The second conversion unit 219 may convert the output signal of the downconverter 218 into a digital signal and transmit the digital signal to a modem.

An example of the second conversion unit 219 is shown in FIG. 4. In the example shown in FIG. 4, the second conversion unit 219 may include a plurality of ADCs 410-1 to 410-n, a demultiplexer (DEMUX) 420, and a multiplexer (MUX) 430.

Each of the plurality of ADCs 410-1 to 410-n may include a sample (S)/hold (H) circuit for sampling an input signal.

In the example shown in FIG. 4, the ADCs 410-1 to 410-n may be time-interleaved ADCs. The time-interleaved ADCs 410-1 to 410-n may generate digital signals by alternately sampling and digitizing the output signal of the downconverter 218. For example, the DEMUX 420 may transmit the output signal of the downconverter 218 to the first ADC 410-1 by connecting an input terminal of the first ADC 410-1 and an output terminal of the downconverter 218, and the first ADC 410-1 may convert an output signal of the downconverter 218 into a digital signal. The DEMUX 420 may transmit the output signal of the downconverter 218 to the second ADC 410-2 by connecting an input terminal of the second ADC 410-2 and the output terminal of the downconverter 218, and the second ADC 410-2 may convert the output signal of the downconverter 218 into a digital signal. The DEMUX 420 may transmit the output signal of the downconverter 218 to the n-th ADC 410-n by connecting an input terminal of the n-th ADC 410-n and the output terminal of the downconverter 218, and the n-th ADC 410-n may convert the output signal of the downconverter 218 into a digital signal.

The MUX 430 may multiplex (or combine) the digital signals converted respectively by the time-interleaved ADCs 410-1 to 410-n and transmit a digital signal obtained by multiplexing to a modem.

Figure 5:
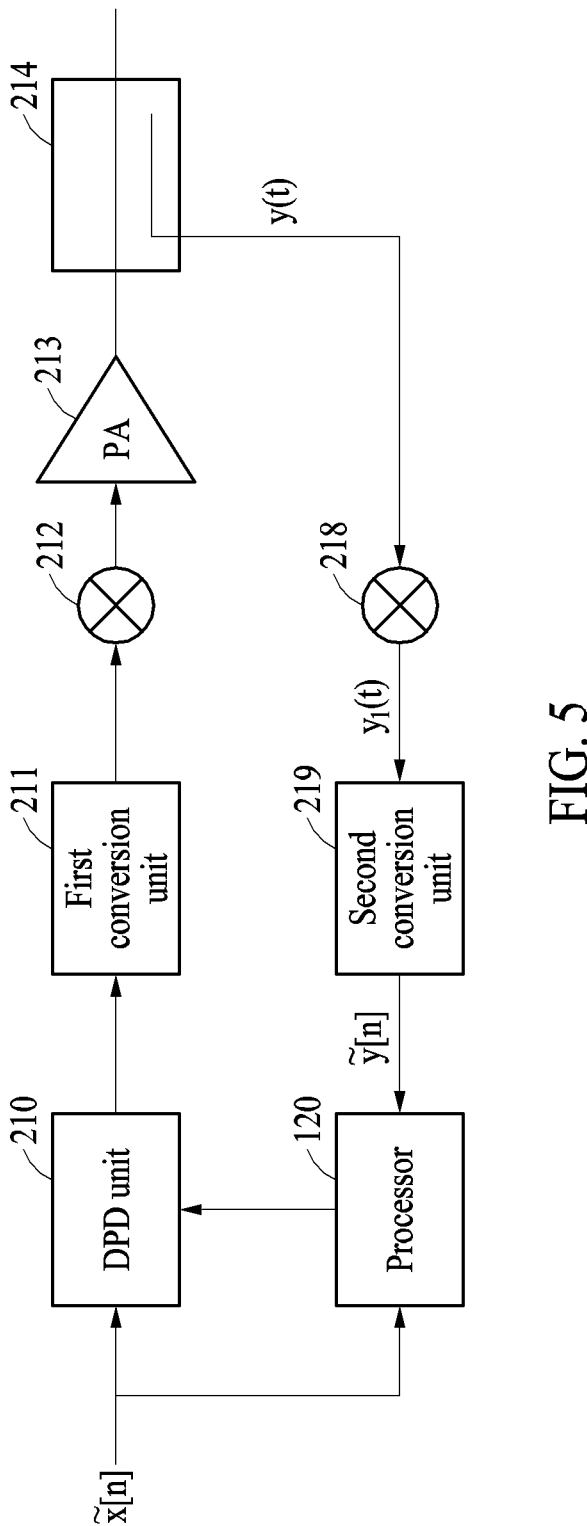
FIGS. 5 to 7 are exemplary diagrams illustrating power saving in a digital predistortion (DPD) parameter update operation of a communication device according to various embodiments.
Figure 6:
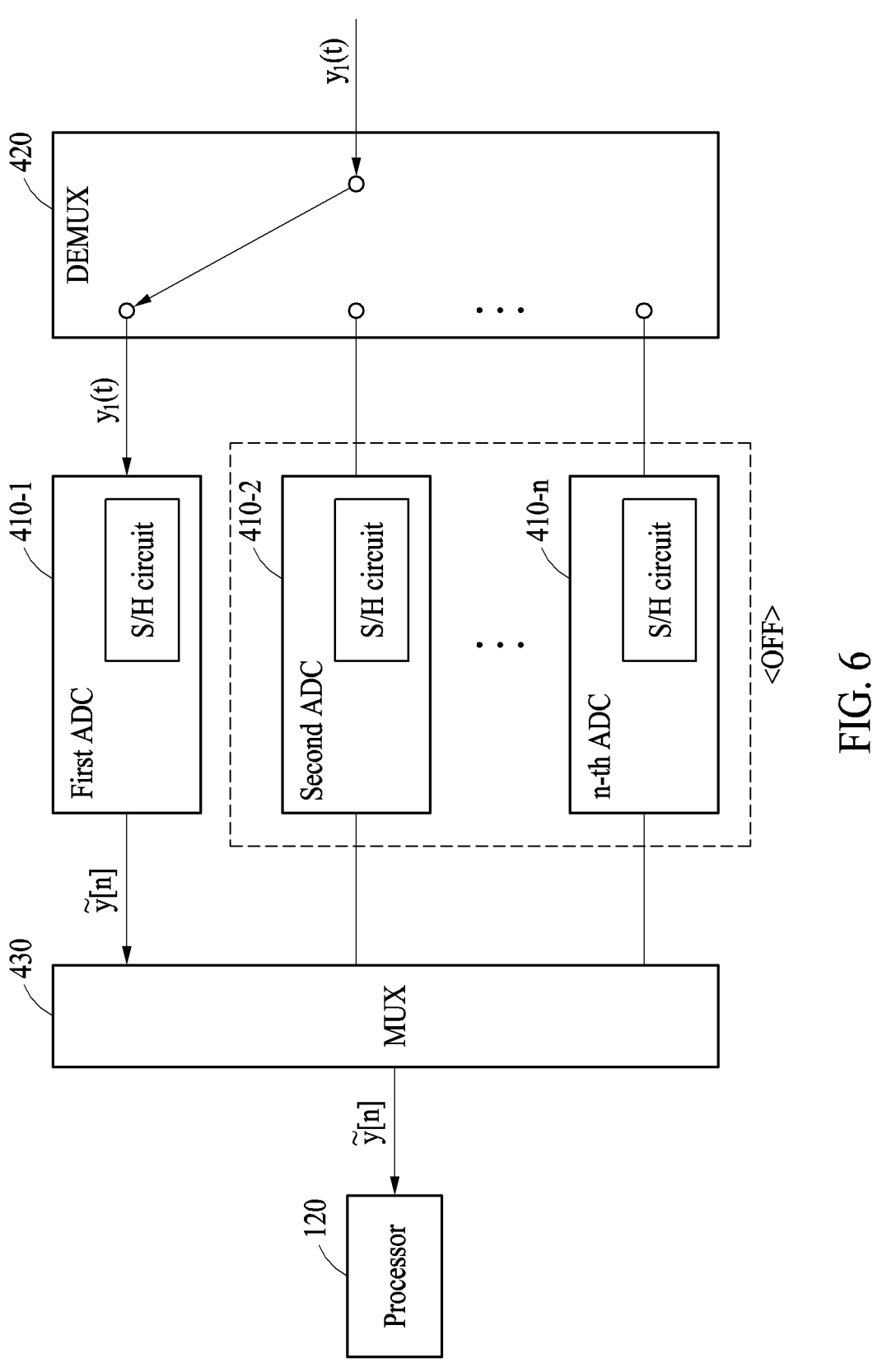
Figure 7:
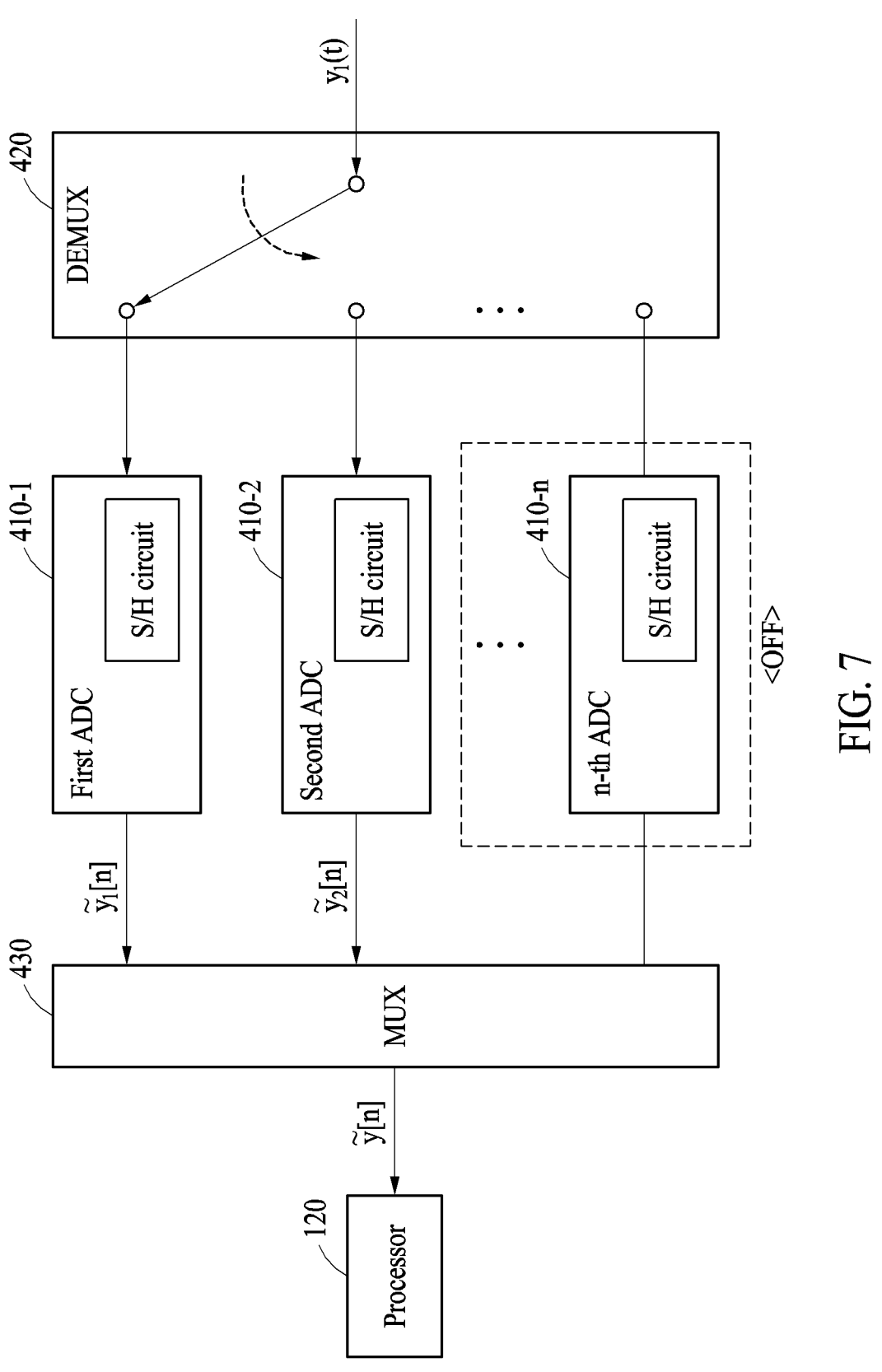

FIGS. 5 to 7 are exemplary diagrams illustrating power saving in a digital predistortion (DPD) parameter update operation of a communication device according to various embodiments.

In the example shown in FIG. 5, the communication device 100 may perform a DPD parameter update operation. In the DPD parameter update operation, the receiver 130 may operate as an observation receiver for observing an output signal of the PA 213 of the transmitter 110. The DPD parameter update operation may also be referred to as an observation operation.

ADCs 410-1 to 410-n in the second conversion unit 219 may each perform digitization at a high frequency (e.g., 10 gigahertz (GHz)) and may operate at high speed, consuming a lot of power. According to an embodiment, in the DPD parameter update operation, the processor 120 may achieve power saving by causing one or more of the ADCs 410-1 to 410-n to be turned on and the remaining ADCs to be turned off.

According to an embodiment, the PA 213 may have nonlinear characteristics due to a memoryless effect. The memoryless effect may indicate that the current input signal of the PA 213 affects the output signal of the PA 213. The DPD unit 210 may be implemented to compensate for the nonlinear characteristics due to the memoryless effect. In this case, the processor 120 may turn on one of the ADCs 410-1 to 410-n and turn off the remaining ADCs. The remaining ADCs may be turned off, such that power saving may be achieved.

According to another embodiment, the PA 213 may have nonlinear characteristics due to a memory effect. The memory effect may indicate that previous input signals as well as the current input signal of the PA 213 affect the output signal of the PA 213. The DPD unit 210 may be implemented to compensate for the nonlinear characteristics due to the memory effect. In this case, the processor 120 may turn on two or more of the ADCs 410-1 to 410-n and turn off the remaining ADCs. The remaining ADCs may be turned off, such that power saving may be achieved.

In the example shown in FIG. 5, the DPD unit 210 may distort an input signal $\tilde{x}[n]$ (e.g., a baseband signal received from a modem). An output signal of the DPD unit 210 may be input to the first conversion unit 211. The processor 120 may obtain (or capture) the input signal $\tilde{x}[n]$ of the DPD unit 210.

According to an embodiment, the transmitter 110 may further include a crest factor reduction (CFR) unit (not shown) for performing CFR on the input signal $\tilde{x}[n]$. For example, the CFR unit may verify the peak power of the input signal $\tilde{x}[n]$, and may cause the processor 120 to capture the input signal $\tilde{x}[n]$ when the verified peak power exceeds a threshold. In other words, the CFR unit may trigger the processor 120 to capture the input signal $\tilde{x}[n]$ when the peak power of the input signal $\tilde{x}[n]$ exceeds the threshold value.

The first conversion unit 211 may convert the output signal of the DPD unit 210 into an analog signal.

The upconverter 212 may perform frequency up-conversion on the converted analog signal to generate an RF signal. The RF signal may be input to the PA 213.

The PA 213 may amplify the power of the input RF signal. The amplified RF signal may be transmitted to the coupler 214.

The coupler 214 may couple the amplified RF signal. For example, the coupler 214 may couple a portion of the amplified RF signal, transmit the coupled portion of the RF signal to the downconverter 218, and transmit the remaining portion to the transmission antenna 215.

The downconverter 218 may perform frequency down-conversion on the coupled RF signal y(t). An output signal $y_1(t)$ of the downconverter 218 may be transmitted to the second conversion unit 219.

The second conversion unit 219 may convert the output signal $y_1(t)$ into a digital signal $\tilde{y}[n]$ and transmit the digital signal $\tilde{y}[n]$ to the processor 120. The operation of the second conversion unit 219 will be described with reference to FIGS. 6 and 7.

An example of the operation of the second conversion unit 219, when the DPD unit 210 is implemented to compensate for the nonlinear characteristics of the PA 213 due to the memoryless effect, is shown in FIG. 6.

In the example shown in FIG. 6, the DPD unit 210 may be implemented to compensate for the nonlinear characteristics of the PA 213 due to the memoryless effect, so that in the DPD parameter update operation, one ADC may be turned on, and the remaining ADCs may be turned off. For example, the processor 120 may cause the first ADC 410-1 among the plurality of ADCs 410-1 to 410-n to be turned on. The remaining ADCs 410-2 to 410-n may be turned off.

In the example shown in FIG. 6, the DEMUX 420 may transmit the output signal $y_1(t)$ of the downconverter 218 to the first ADC 410-1 by connecting the input terminal of the first ADC 410-1 and the output terminal of the downconverter 218. The DEMUX 420 may not connect the input terminal of each of the remaining ADCs 410-2 to 410-n to the output terminal of the downconverter 218.

In the example shown in FIG. 6, the first ADC 410-1 may convert the input signal $y_1(t)$ into a digital signal $\tilde{y}[n]$ and transmit the digital signal $\tilde{y}[n]$ to the MUX 430.

The MUX 430 may transmit the digital signal $\tilde{y}[n]$ to the processor 120.

In the example shown in FIG. 6, the processor 120 may determine a DPD parameter based on the input signal x̃[n] and the digital signal ỹ[n] and control the DPD unit 210 based on the determined DPD parameter. The DPD parameter may include, for example, a coefficient of a first DPD function of the DPD unit 210. The first DPD function may include, for example, a function to approximate the inversion of a first model that models the nonlinear characteristics of the PA 213 due to the memoryless effect. According to an embodiment, the processor 120 may calculate the coefficient of the first DPD function of the DPD unit 210 using the input signal x̃[n] and the digital signal ỹ[n] and transmit the calculated coefficient to the DPD unit 210. The DPD unit 210 may update the existing coefficient of the first DPD function with the coefficient received from the processor 120 and perform distortion based on the first DPD function with the coefficient updated.

An example of the operation of the second conversion unit 219, when the DPD unit 210 is implemented to compensate for the nonlinear characteristics of the PA 213 due to the memory effect, is shown in FIG. 7.

In the example shown in FIG. 7, the DPD unit 210 may store or include a second DPD function for distortion. The second DPD function may include, for example, a function to approximate the inversion of a second model that models the nonlinear characteristics of the PA 213 due to the memory effect. Equation 1 below shows a memory polynomial model that is an example of the second model. The second model is not limited to the memory polynomial model in Equation 1 below.

$$y(n) = \sum_{k=0}^{K-1} \sum_{m=1}^{M} b_{km} x(n) |x(n-m)|^k \qquad \text{[Equation 1]}$$

In Equation 1 above, x(n) may denote the input signal of the PA 213 expressed as a discrete signal, and y(n) may denote the output signal (or the coupled RF signal y(t)) of the PA 213 expressed as a discrete signal. Further, in Equation 1 above, k may denote a polynomial order, M may denote a memory order, and $b_{km}$ may denote the coefficient of the memory polynomial model.

According to an embodiment, when the DPD unit 210 is implemented to compensate for the nonlinear characteristics of the PA 213 due to the memory effect, the number of ADCs to be turned on in the DPD parameter update operation may be determined based on the memory order of the second model. As an example, if the memory order is "2", two ADCs may be turned on in the DPD update operation. As another example, if the memory order is "3", three ADCs may be turned on in the DPD update operation.

In the example shown in FIG. 7, the memory order of the second model may be "2". In the DPD update operation, two ADCs (e.g., the first ADC 410-1 and the second ADC 410-2) may be turned on, and the remaining ADCs 410-3 to 410-n may be turned off. According to an embodiment, which of the ADCs 410-1 to 410-n is to be turned on in the DPD update operation may be pre-designated. In the case of the example shown in FIG. 7, the first ADC 410-1 and the second ADC 410-2 may be pre-designated to be turned on in the DPD update operation. In the DPD update operation, the first ADC 410-1 and the second ADC 410-2 may be turned on, and the remaining ADCs 410-3 to 410-n may be turned off. According to another embodiment, the processor 120 may randomly select which of the ADCs 410-1 to 410-n to be turned on in the DPD update operation. The processor 120 may randomly select the first ADC 410-1 and the second ADC 410-2, so that in the DPD update operation, the first ADC 410-1 and the second ADC 410-2 may be turned on, and the remaining ADCs 410-3 to 410-n may be turned off.

In the example shown in FIG. 7, the DEMUX 420 may transmit the output signal $y_1$(t) of the downconverter 218 to the first ADC 410-1 by connecting the input terminal of the first ADC 410-1 to the output terminal of the downconverter 218. The first ADC 410-1 may convert the input signal into a digital signal ỹ₁[n] and transmit the digital signal ỹ₁[n] to the MUX 430.

The DEMUX 420 may transmit the output signal $y_1$(t) of the downconverter 218 to the second ADC 410-2 by connecting the input terminal of the second ADC 410-2 to the output terminal of the downconverter 218. The second ADC 410-2 may convert the input signal into a digital signal ỹ₂[n] and transmit the digital signal ỹ₂[n] to the MUX 430.

In the example shown in FIG. 7, the DEMUX 420 may not connect the input terminal of each of the remaining ADCs 410-3 to 410-n to the output terminal of the downconverter 218.

In the example shown in FIG. 7, the MUX 430 may multiplex the digital signal ỹ₁[n] and the digital signal ỹ₂[n] and output a digital signal ỹ[n] to the processor 120. In other words, the MUX 430 may generate the digital signal ỹ[n] by combining the digital signal ỹ₁[n] and the digital signal ỹ₂[n] and transmit the digital signal ỹ[n] to the processor 120.

In the example shown in FIG. 7, the processor 120 may determine a DPD parameter based on the input signal x̃[n] and the digital signal ỹ[n] and control the DPD unit 210 based on the determined DPD parameter. The DPD parameter may include, for example, a coefficient of a second DPD function of the DPD unit 210. As an example, the processor 120 may calculate the coefficient of the second DPD function of the DPD unit 210 using the input signal x̃[n] and the digital signal ỹ[n] and transmit the calculated coefficient to the DPD unit 210. The DPD unit 210 may update the existing coefficient of the second DPD function with the coefficient received from the processor 120 and perform distortion based on the second DPD function with the coefficient updated.

According to an embodiment, the transmitter 110 may distort an input signal through the DPD unit 210, convert the distorted input signal into an analog signal, perform frequency up-conversion on the converted analog signal to generate a first signal, amplify the generated first signal through the PA 213, and couple the amplified first signal, in a first operation (e.g., the DPD parameter update operation).

According to an embodiment, in the first operation, the receiver 130 may receive the coupled first signal from the transmitter 110, perform frequency down-conversion on the coupled first signal to generate a second signal, and convert the generated second signal into a digital signal through the turned-on one or more ADCs among the plurality of ADCs 410-1 to 410-n.

According to an embodiment, in the first operation, the processor 120 may cause one or more of the ADCs 410-1 to 410-n in the receiver 130 to be turned on and a remainder of the ADCs to be turned off.

According to an embodiment, the DPD unit 210 may is configured to distort an input signal according to a distortion function.

According to an embodiment, the distortion function for distorting the input signal may be a function determined based on the inverse of a model that models the first nonlinear characteristics of the PA 213 (e.g., the first model described above), and one ADC may be turned on in the first operation.

According to an embodiment, the first nonlinear characteristics may be the nonlinear characteristics of the PA 213 due to a memoryless effect on an output of the PA 213.

According to an embodiment, the distortion function for distorting the input signal may be a function determined based on the inverse of a model that models the second nonlinear characteristics of the PA 213 (e.g., the second model described above), and the number of ADCs to be turned on in the first operation may be determined based on the memory order of the model that models the second nonlinear characteristics of the PA 213.

According to an embodiment, the second nonlinear characteristics may be the nonlinear characteristics of the PA 213 due to a memory effect on an output of the PA 213.

According to an embodiment, in response to a change from the first operation to a second operation (e.g., a reception operation), the turned-off ADCs may be turned on—that is, each of the ADCs 410-1 to 410-$n$ may now be turned on—and in the second operation, the receiver 130 may convert a signal received through the reception antenna 216 into a digital signal through each of the plurality of ADCs.

According to an embodiment, the processor 120 may determine a predistortion parameter (e.g., the DPD parameter described above) using the converted digital signal and the input signal of the DPD unit 210 and control the DPD unit 210 using the determined predistortion parameter.

According to an embodiment, the receiver 130 may operate as an observation receiver for observing the transmitter 110 in the first operation.

According to an embodiment, the ADCs 410-1 to 410-$n$ may be time-interleaved.

Figure 8:
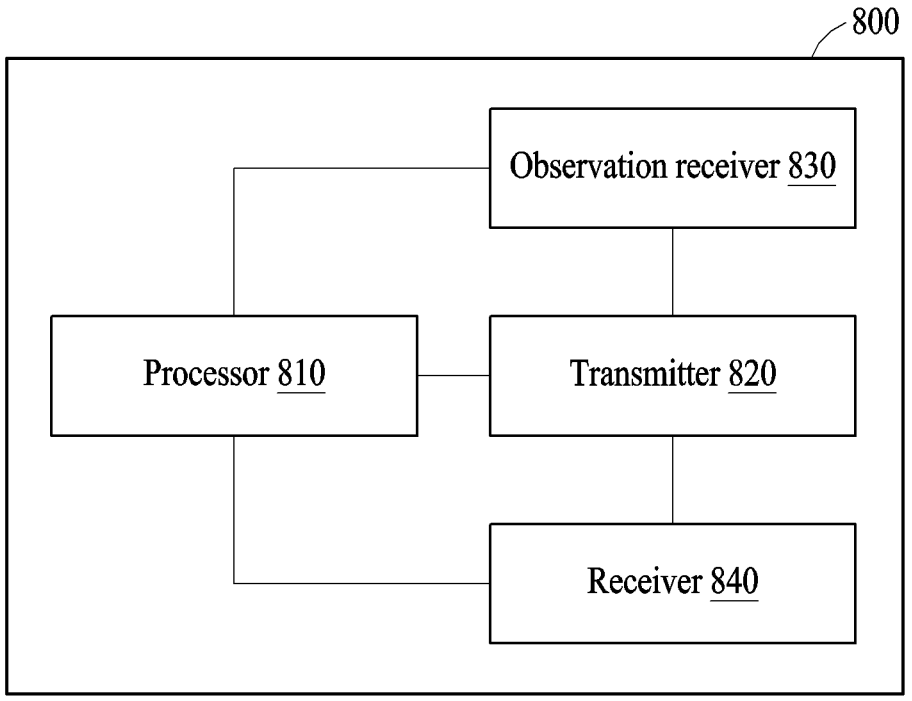
FIG. 8 is another exemplary diagram illustrating a communication device according to various embodiments.

FIG. 8 is another exemplary diagram illustrating a communication device according to various embodiments.

Referring to FIG. 8, a communication device 800 may include a processor 810, a transmitter 820, an observation receiver 830, and a receiver 840.

The receiver 130 of the communication device 100 described with reference to FIGS. 1 to 7 may perform a reception operation and operate as an observation receiver for observing the transmitter 110 in a DPD parameter update operation. The communication device 800 to be described with reference to FIG. 8 may include the observation receiver 830 which is distinct from the receiver 840 for performing the reception operation.

According to an embodiment, the communication device 800 may be included in an electronic device (e.g., a smartphone or a tablet personal computer (PC)) and may communicate with an external device (e.g., a base station device). According to another embodiment, the communication device 800 may be included in a base station device (e.g., an RU) and may communicate with an external device (e.g., an electronic device such as a mobile terminal).

The processor 810 may control the communication device 800 overall.

According to an embodiment, in a transmission operation, the transmitter 820 may distort an input signal (e.g., a baseband signal received from a modem), convert the distorted input signal into an RF signal, amplify the converted RF signal, and transmit the amplified RF signal to an external device through an antenna.

According to an embodiment, in the reception operation, the receiver 840 may convert the RF signal received through an antenna into a baseband signal and transmit the baseband signal to a modem (not shown).

According to an embodiment, the communication device 800 may perform the DPD parameter update operation. In the DPD parameter update operation, the transmitter 820 may distort the input signal through a DPD unit (not shown), convert the distorted input signal into an RF signal, and amplify the converted RF signal. The processor 810 may capture the input signal of the transmitter 820. The transmitter 820 may transmit or feed the amplified RF signal back to the observation receiver 830. The observation receiver 830 may perform frequency down-conversion on the amplified RF signal received from the transmitter 820, convert the frequency-down-converted RF signal into a digital signal through an ADC (not shown), and transmit the converted digital signal to the processor 810.

According to an embodiment, the observation receiver 830 may include the ADC. The ADC in the observation receiver 830 may be a wideband ADC that operates in a wideband. The sampling time of the ADC in the observation receiver 830 may be less than "predetermined value/signal bandwidth". The predetermined value may be, for example, "0.5" but is not limited thereto. As an example, when the signal bandwidth for signal transmission of the transmitter 820 is 1 GHz, the sampling time of the ADC in the observation receiver 830 may be less than "500" picoseconds (ps). The sampling frequency of the ADC in the observation receiver 830 may be less than "n times the signal bandwidth". Here, n may be "2" but is not limited thereto. The ADC in the observation receiver 830 may be less expensive than the ADCs (e.g., the plurality of ADCs 410-1 to 410-$n$) used in the receiver 840 and may perform high-speed processing.

The processor 810 may determine a DPD parameter using the captured input signal and the digital signal received from the ADC in the observation receiver 830 and control the DPD unit in the transmitter 820 using the determined DPD parameter.

Figure 9:
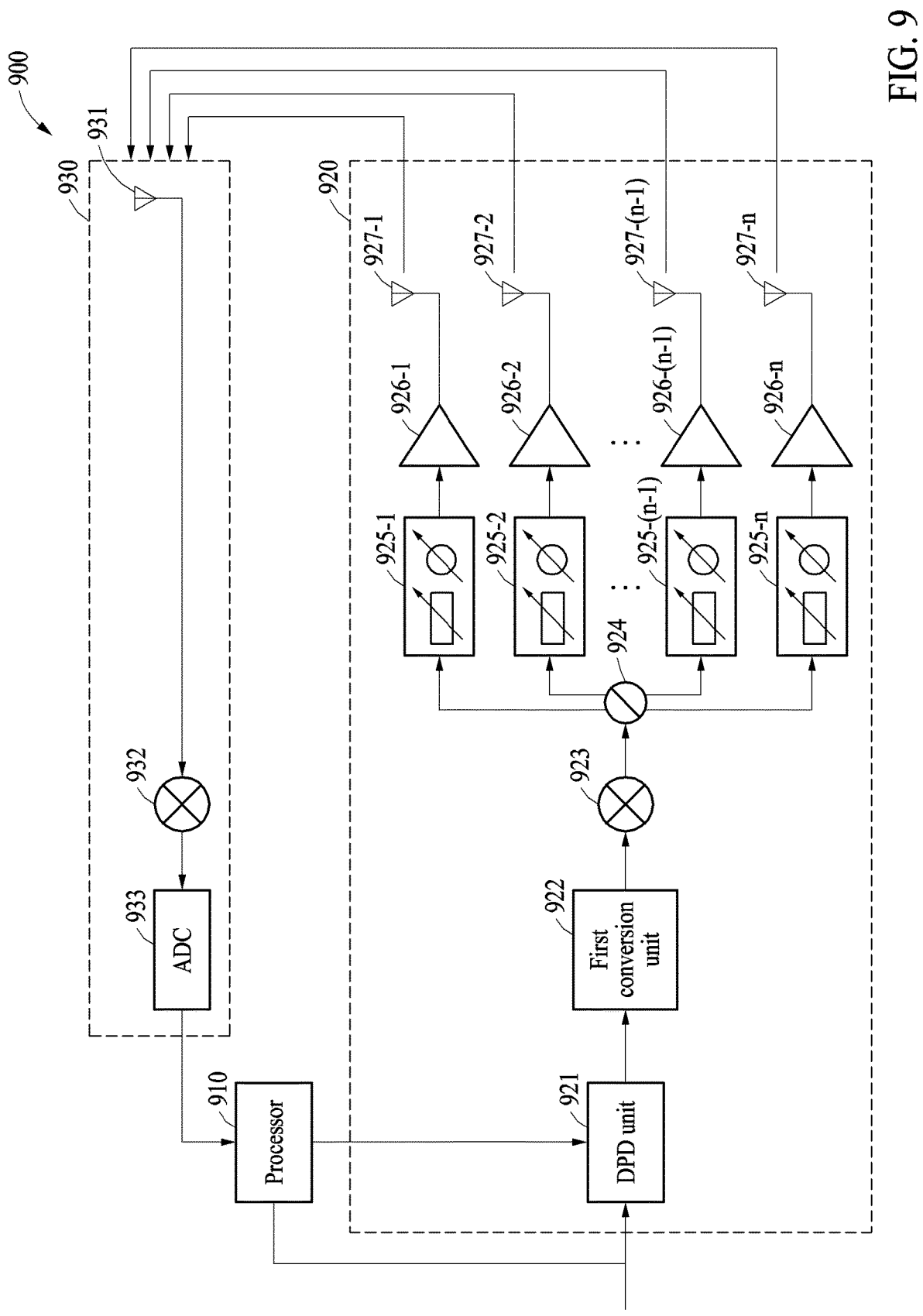
FIG. 9 is a diagram illustrating an example of a transmitter and an observation receiver in a communication device according to various embodiments.

FIG. 9 is a diagram illustrating an example of a transmitter and an observation receiver in a communication device according to various embodiments.

Referring to FIG. 9, a communication device 900 may include a processor 910, a transmitter 920, and an observation receiver 930. Although not shown in FIG. 9, the communication device 900 may include a receiver 840. The transmitter 920 and the observation receiver 930 to be described with reference to FIG. 9 may correspond to an example of the transmitter 820 and an example of the observation receiver 830 of FIG. 8, respectively. According to an embodiment, the structure of the transmitter 920 to be described with reference to FIG. 9 may apply to the transmitter 110 of FIG. 1.

In the example shown in FIG. 9, the transmitter 920 may include a DPD unit 921, a first conversion unit 922, an upconverter 923, a splitter 924, a plurality of blocks 925-1 to 925-$n$, a plurality of PAs 926-1 to 926-$n$, and a plurality of antennas 927-1 to 927-$n$. The antennas 927-1 to 927-$n$ may form an array structure.

In the example shown in FIG. 9, the observation receiver 930 may include an antenna 931, a downconverter 932, and an ADC 933.

The DPD unit 921 may distort an input signal (e.g., a baseband digital signal received from a modem) and output the distorted input signal to the first conversion unit 922. According to an embodiment, the DPD unit 921 may operate substantially the same as the DPD unit 210 of FIG. 2.

The processor 910 may capture the input signal of the DPD unit 921.

The first conversion unit 922 may include one or more DACs. The first conversion unit 922 may convert the distorted input signal into an analog signal and output the converted analog signal to the upconverter 923.

The upconverter 923 may output a signal generated by performing frequency up-conversion on the received analog signal to the splitter 924.

In the example shown in FIG. 9, the splitter 924, the plurality of blocks 925-1 to 925-$n$, and the plurality of PAs 926-1 to 926-$n$ may operate as an analog beamformer. An analog beamformer may perform analog beamforming on an input signal.

According to an embodiment, the splitter 924 may split an input signal into a plurality of signals and output the split signals respectively to the blocks 925-1 to 925-$n$. Each of the blocks 925-1 to 925-$n$ may include a phase shifter and an attenuator but is not limited thereto. Each of the blocks 925-1 to 925-$n$ may change the phase and/or amplitude of an input signal. Output signals of the blocks 925-1 to 925-$n$ may be input respectively to the PAs 926-1 to 926-$n$. Each of the PAs 926-1 to 926-$n$ may amplify and output an input signal, and output signals of the PAs 926-1 to 926-$n$ may be transmitted respectively to the antennas 927-1 to 927-$n$.

Signals output from the antennas 927-1 to 927-$n$ may be received by the antenna 931 of the observation receiver 930. In the example shown in FIG. 9, the antenna 931 of the observation receiver 930 may be located in a far field of the antennas 927-1 to 927-$n$.

The signals received by the antenna 931 of the observation receiver 930 may be input to the downconverter 932, and the downconverter 932 may perform frequency down-conversion on input signals. Output signals of the downconverter 932 may be input to the ADC 933.

The ADC 933 may convert input signals into digital signals. According to an embodiment, the sampling time of the ADC 933 may be less than "0.5/signal bandwidth", and the sampling frequency of the ADC 933 may be less than "twice the signal bandwidth". Accordingly, the ADC 933 may perform high-speed processing.

Output signals of the ADC 933 may be input to the processor 910. The processor 910 may determine a DPD parameter based on the output signals of the ADC 933 and the captured input signal and control the DPD unit 821 based on the determined DPD parameter. According to an embodiment, the processor 910 may calculate a coefficient of a DPD function (e.g., the first DPD function or the second DPD function) of the DPD unit 921 using the output signals of the ADC 933 and the captured input signal of the DPD unit 921 and transmit the calculated coefficient to the DPD unit 921. The DPD unit 921 may update the existing coefficient of the DPD function with the received coefficient and distort the input signal through the DPD function with the coefficient updated.

Figure 10:
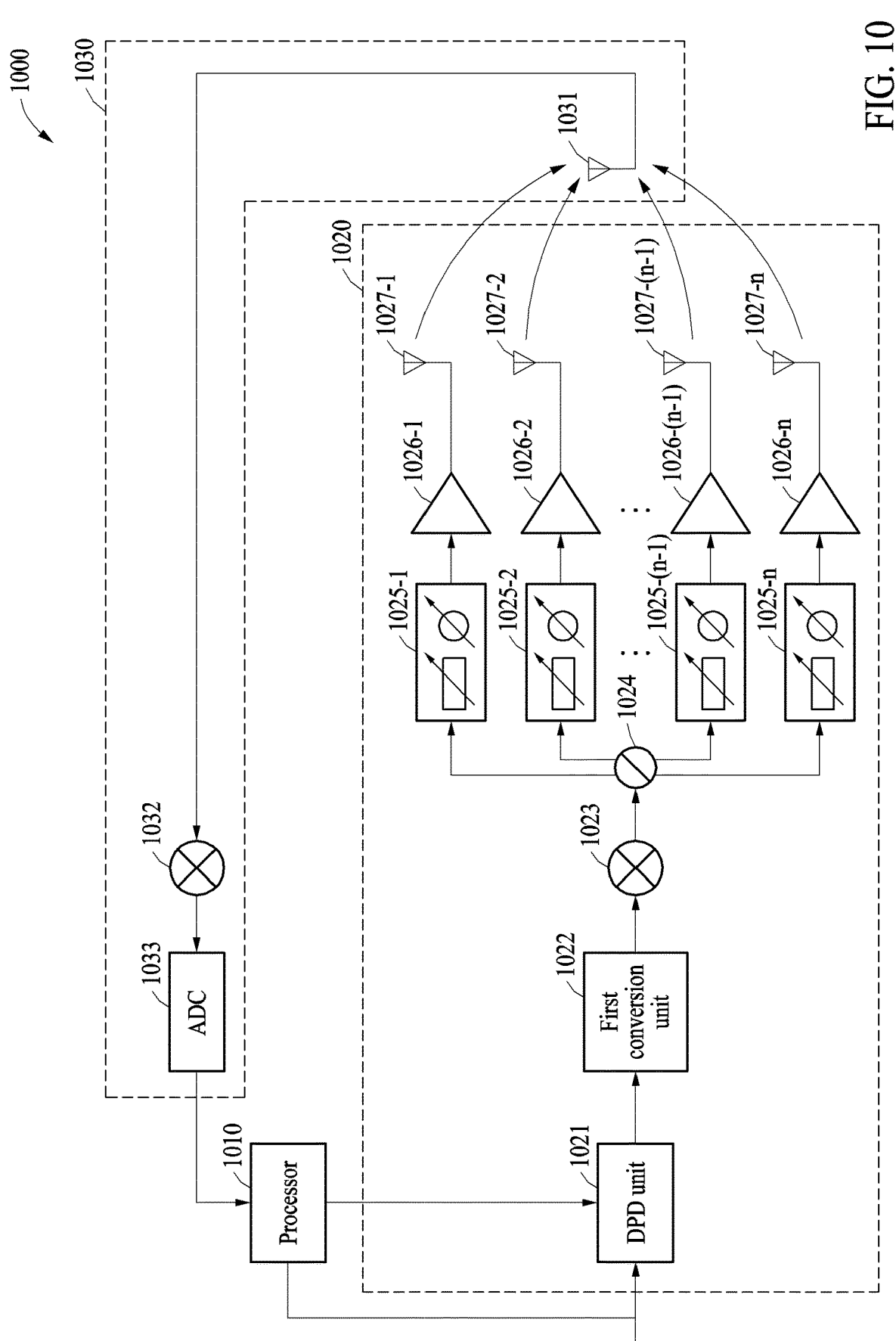
FIG. 10 is a diagram illustrating another example of a transmitter and an observation receiver in a communication device according to various embodiments.

FIG. 10 is a diagram illustrating another example of a transmitter and an observation receiver in a communication device according to various embodiments.

Referring to FIG. 10, a communication device 1000 may include a processor 1010, a transmitter 1020, and an observation receiver 1030. Although not shown in FIG. 10, the communication device 1000 may include a receiver 840. The transmitter 1020 and the observation receiver 1030 to be described with reference to FIG. 10 may correspond to an example of the transmitter 820 and an example of the observation receiver 830 of FIG. 8, respectively.

In the example shown in FIG. 10, the transmitter 1020 may include a DPD unit 1021, a first conversion unit 1022, an upconverter 1023, a splitter 1024, a plurality of blocks 1025-1 to 1025-$n$, a plurality of PAs 1026-1 to 1026-$n$, and a plurality of antennas 1027-1 to 1027-$n$. The observation receiver 1030 may include an antenna 1031, a downconverter 1032, and an ADC 1033.

Since the transmitter 1020 of FIG. 10 may be substantially the same as the transmitter 920 described with reference to FIG. 9, a detailed description of the transmitter 1020 of FIG. 10 will be omitted.

Signals output from the antennas 1027-1 to 1027-$n$ may be received by the antenna 1031 of the observation receiver 1030. In the example shown in FIG. 10, the antenna 1031 of the observation receiver 1030 may be located in a near field of the antennas 1027-1 to 1027-$n$.

The signals received by the antenna 1031 of the observation receiver 1030 may be input to the downconverter 1032, and the downconverter 1032 may perform frequency down-conversion on input signals. Output signals of the downconverter 1032 may be input to the ADC 1033.

The ADC 1033 may convert the input signals into digital signals. According to an embodiment, the sampling time of the ADC 1033 may be less than "0.5/signal bandwidth", and the sampling frequency of the ADC 1033 may be less than "twice the signal bandwidth". Accordingly, the ADC 1033 may perform high-speed processing.

Since the processor 1010 of FIG. 10 may operate substantially the same as the processor 910 of FIG. 9, a detailed description of the processor 1010 of FIG. 10 will be omitted.

Figure 11:
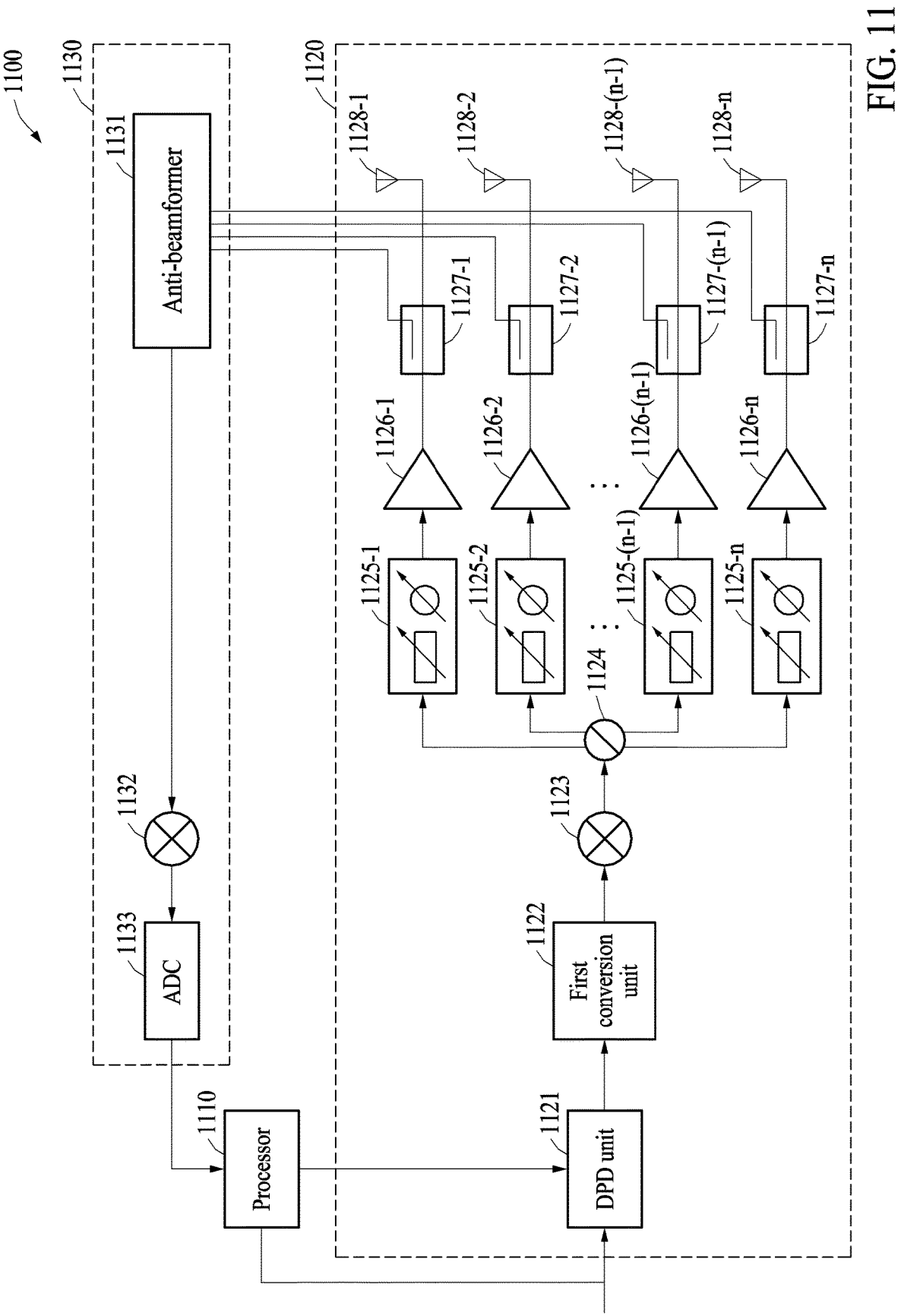
FIG. 11 is a diagram illustrating still another example of a transmitter and an observation receiver in a communication device according to various embodiments.

FIG. 11 is a diagram illustrating still another example of a transmitter and an observation receiver in a communication device according to various embodiments.

Referring to FIG. 11, a communication device 1100 may include a processor 1110, a transmitter 1120, and an observation receiver 1130. Although not shown in FIG. 11, the communication device 1100 may include a receiver 840. The transmitter 1120 and the observation receiver 1130 to be described with reference to FIG. 11 may correspond to an example of the transmitter 820 and an example of the observation receiver 830 of FIG. 8, respectively.

In the example shown in FIG. 11, the transmitter 1120 may include a DPD unit 1121, a first conversion unit 1122, an upconverter 1123, a splitter 1124, a plurality of blocks 1125-1 to 1125-$n$, a plurality of PAs 1126-1 to 1126-$n$, a plurality of couplers 1127-1 to 1127-$n$, and a plurality of antennas 1128-1 to 1128-$n$. The observation receiver 1130 may include an anti-beamformer 1131, a downconverter 1132, and an ADC 1133.

The DPD unit 1121, the first conversion unit 1122, the upconverter 1123, the splitter 1124, the plurality of blocks 1125-1 to 1025-$n$, and the plurality of PAs 1126-1 to 1026-$n$ of FIG. 11 may operate substantially the same as the DPD unit 921, the first conversion unit 922, the upconverter 923, the splitter 924, the plurality of blocks 925-1 to 925-$n$, and the plurality of PAs 926-1 to 926-$n$ of FIG. 9. A detailed description of the DPD unit 1121, the first conversion unit 1122, the upconverter 1123, the splitter 1124, the plurality of blocks 1125-1 to 1025-$n$, and the plurality of PAs 1126-1 to 1026-$n$ of FIG. 11 will be omitted.

Output signals of the plurality of PAs 1126-1 to 1126-$n$ may be input respectively to the couplers 1127-1 to 1127-$n$. Each of the couplers 1127-1 to 1127-$n$ may couple the input signal and transmit the coupled input signal to the anti-beamformer 1131 of the observation receiver 1130.

The anti-beamformer 1131 may perform anti-beamforming on the signals received respectively from the couplers 1127-1 to 1127-$n$ and output a signal generated through anti-beamforming to the downconverter 1132. The down-converter 1132 may perform frequency down-conversion on the input signal. An output signal of the downconverter 1132 may be input to the ADC 1133.

The ADC 1133 may convert the input signal into a digital signal. According to an embodiment, the sampling time of the ADC 1133 may be less than "0.5/signal bandwidth", and the sampling frequency of the ADC 1133 may be less than "twice the signal bandwidth". Accordingly, the ADC 1133 may perform high-speed processing.

Since the processor 1110 of FIG. 11 may operate substantially the same as the processor 910 of FIG. 9, a detailed description of the processor 1110 of FIG. 11 will be omitted.

According to an embodiment, in a first operation (e.g., a DPD parameter update operation), the transmitter 820, 920, 1020, or 1120 may distort an input signal through the DPD unit 921, 1021, or 1121, convert the distorted input signal into an analog signal, perform frequency up-conversion on the converted analog signal to generate a first signal, amplify the generated first signal, and transmit the amplified first signal to the first receiver 830, 930, 1030, or 1130 through one or more antennas or one or more couplers.

According to an embodiment, in the first operation, the first receiver 830, 930, 1030, or 1130 may perform frequency down-conversion on the received first signal to generate a second signal, convert the second signal into a digital signal through the ADC 933, 1033, or 1133, and transmit the converted digital signal to the processor 810, 910, 1010, or 1110, and may be deactivated in a second operation (e.g., a reception operation).

According to an embodiment, in the second operation, the second receiver 840 may receive a signal from an external device through one or more antennas.

According to an embodiment, the processor 810, 910, 1010, or 1110 may be coupled with the transmitter 820, 920, 1020, or 1120, the first receiver 830, 930, 1030, or 1130, and the second receiver 840.

According to an embodiment, the ADC 933, 1033, or 1133 may be less than the time calculated using the transmission signal bandwidth of the transmitter 820, 920, 1020, or 1120 and a predetermined value (e.g., "2").

According to an embodiment, the calculated time may represent a result of dividing the predetermined value by the transmission signal bandwidth.

According to an embodiment, the sampling frequency of the ADC 933, 1033, or 1133 may be less than n times the transmission signal bandwidth of the transmitter 820, 920, 1020, or 1120.

According to an embodiment, n may include "2".

According to an embodiment, the processor 810, 910, 1010, or 1110 may determine a predistortion parameter (e.g., a DPD parameter) based on the received digital signal and the input signal of the DPD unit 921, 1021, or 1121 and control the DPD unit 921, 1021, or 1121 based on the determined predistortion parameter.

FIG. 12 is a flowchart illustrating an operating method of a communication device according to various embodiments.

Operations 1210 to 1230 to be described with reference to FIG. 12 may be included in the DPD parameter update operation described above.

Referring to FIG. 12, in operation 1210, the processor 120 of the communication device 100 may control one or more of the plurality of ADCs 410-1 to 410-$n$ in the receiver 130 to be turned on and the remaining ADCs to be turned off. Further, the processor 120 may capture an input signal of the transmitter 110.

In operation 1220, the transmitter 110 of the communication device 100 may distort an input signal through the DPD unit 210, convert the distorted input signal into an analog signal, perform frequency up-conversion on the converted analog signal to generate a first signal, amplify the generated first signal, and couple the amplified first signal.

In operation 1230, the receiver 130 of the communication device 100 may perform frequency down-conversion on the coupled first signal to generate a second signal and convert the generated second signal into a digital signal through the turned-on one or more ADCs. Further, the receiver 130 may transmit the converted digital signal to the processor 120.

The processor 120 may determine a DPD parameter (e.g., a coefficient of a DPD function) using the captured input signal and the digital signal received from the receiver 130 and control the DPD unit 210 based on the determined DPD parameter.

The description provided with reference to FIGS. 1 to 11 may also apply to the description of FIG. 12, and thus, a detailed description thereof will be omitted.

Figure 13:
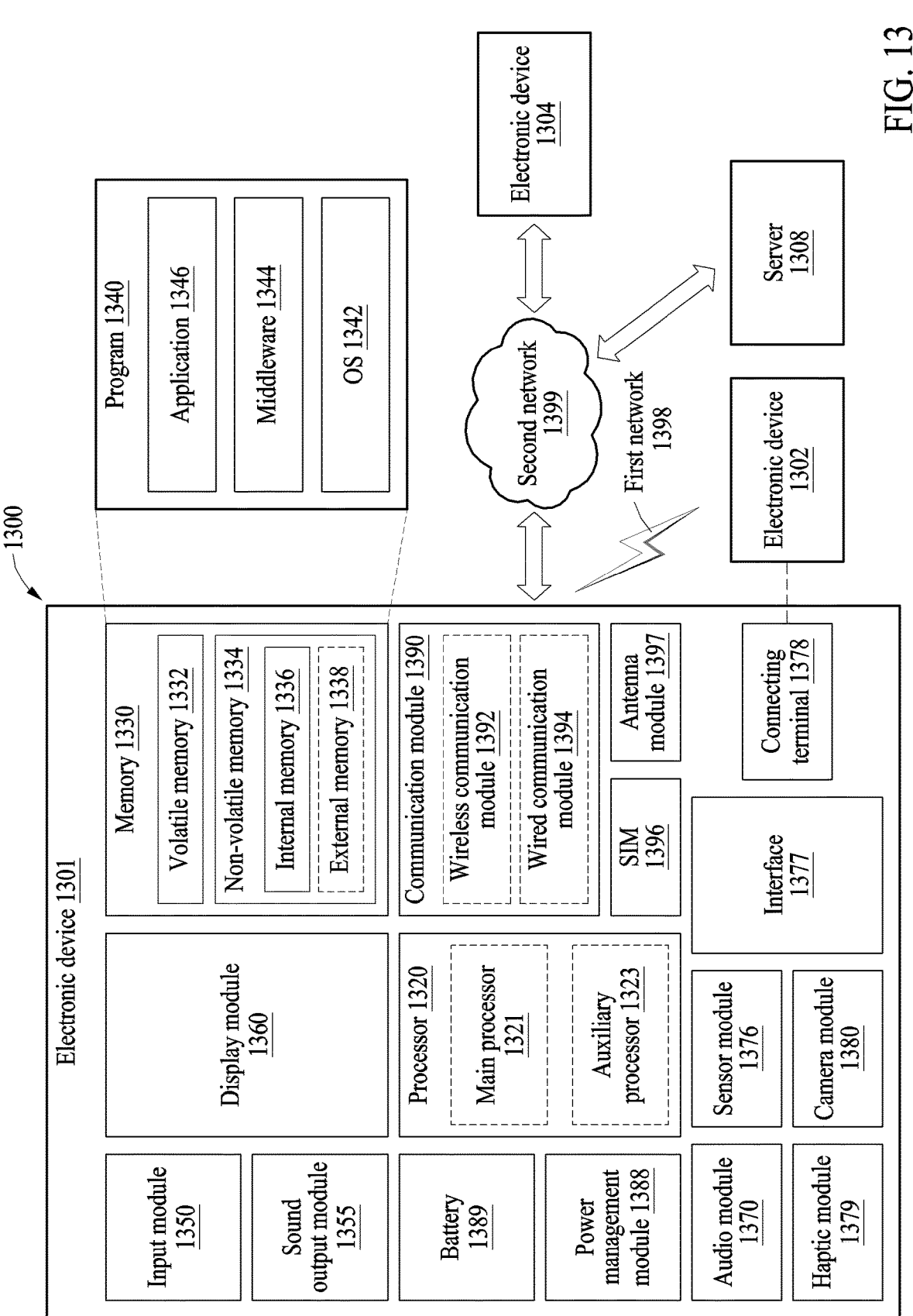
FIG. 13 is a block diagram illustrating an electronic device in a network environment according to various embodiments.

FIG. 13 is a block diagram illustrating an electronic device in a network environment according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or communicate with at least one of an electronic device 1304 or a server 1308 via a second network 1399 (e.g., a long-range wireless communication network). In an embodiment, the electronic device 1301 may communicate with the electronic device 1304 via the server 1308. In an embodiment, the electronic device 1301 may include a processor 1320, a memory 1330, an input module 1350, a sound output module 1355, a display module 1360, an audio module 1370, and a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In an embodiment, at least one of the components (e.g., the connecting terminal 1378) may be omitted from the electronic device 1301, or one or more other components may be added in the electronic device 1301. In an embodiment, some of the components (e.g., the sensor module 1376, the camera module 1380, or the antenna module 1397) may be integrated as a single component (e.g., the display module 1360).

According to an embodiment, the electronic device 1301 may include the communication device 100, the communication device 800, the communication device 900, the communication device 1000, or the communication device 1100.

The processor 1320 may execute, for example, software (e.g., a program 1340) to control at least one other component (e.g., a hardware or software component) of the electronic device 1301 connected to the processor 1320, and may perform various data processing or computation. According to an embodiment, as at least a part of data processing or computation, the processor 1320 may store a command or data received from another component (e.g., the sensor module 1376 or the communication module 1390) in a volatile memory 1332, process the command or the data stored in the volatile memory 1332, and store resulting data in a non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with the main processor 1321. For example, when the electronic device 1301 includes the main processor 1321 and the auxiliary processor 1323, the auxiliary processor 1323 may be adapted to consume less power than the main processor 1321 or to be specific to a specified function. The auxiliary processor 1323 may be implemented separately from the main processor 1321 or as a part of the main processor 1321.

The auxiliary processor 1323 may control at least some of functions or states related to at least one (e.g., the display module 1360, the sensor module 1376, or the communication module 1390) of the components of the electronic device 1301, instead of the main processor 1321 while the main processor 1321 is in an inactive (e.g., sleep) state or along with the main processor 1321 while the main processor 1321 is an active state (e.g., executing an application). According to an embodiment, the auxiliary processor 1323 (e.g., an ISP or a CP) may be implemented as a portion of another component (e.g., the camera module 1380 or the communication module 1390) that is functionally related to the auxiliary processor 1323. According to an embodiment, the auxiliary processor 1323 (e.g., an NPU) may include a hardware structure specified for artificial intelligence model processing. An artificial intelligence model may be generated through machine learning. Such learning may be performed, for example, by the electronic device 1301 in which an artificial intelligence model is executed, or via a separate server (e.g., the server 1308). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

According to an embodiment, the processor 1320 may include the processor 120, the processor 810, the processor 910, the processor 1010, or the processor 1030.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored as software in the memory 1330, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output a sound signal to the outside of the electronic device 1301. The sound output module 1355 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 1360 may visually provide information to the outside (e.g., a user) of the electronic device 1301. The display module 1360 may include, for example, a control circuit for controlling a display, a hologram device, or a projector and control circuitry to control a corresponding one of the display, the hologram device, and the projector. According to an embodiment, the display module 1360 may include a touch sensor adapted to detect a touch, or a pressure sensor adapted to measure the intensity of force incurred by the touch.

The audio module 1370 may convert a sound into an electrical signal or vice versa. According to an embodiment, the audio module 1370 may obtain the sound via the input module 1350 or output the sound via the sound output module 1355 or an external electronic device (e.g., the electronic device 1302 such as a speaker or a headphone) directly or wirelessly connected to the electronic device 1301.

The sensor module 1376 may detect an operational state (e.g., power or temperature) of the electronic device 1301 or an environmental state (e.g., a state of a user) external to the electronic device 1301, and generate an electric signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., by wire) or wirelessly. According to an embodiment, the interface 1377 may include, for example, a high-definition multimedia interface (HDMI), a universal serial bus (USB) interface, a secure digital (SD) card interface, or an audio interface.

The connecting terminal 1378 may include a connector via which the electronic device 1301 may be physically connected to an external electronic device (e.g., the electronic device 1302). According to an embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via his or her tactile sensation or kinesthetic sensation. According to an embodiment, the haptic module 1379 may include, for example, a motor, a piezoelectric element, or an electric stimulator.

The camera module 1380 may capture a still image and moving images. According to an embodiment, the camera module 1380 may include one or more lenses, image sensors, image signal processors, or flashes.

The power management module 1388 may manage power supplied to the electronic device 1301. According to an embodiment, the power management module 1388 may be implemented as, for example, at least a part of a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more CPs (e.g., modems) that are operable independently of the processor 1320 (e.g., an AP) and that support a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module, or a power line communication (PLC) module). A corresponding one of these communication modules may communicate with the external electronic device 1304 via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the SIM 1396.

The wireless communication module 1392 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., a mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

According to an embodiment, the wireless communication module 1392 may include the transmitter 110 and the receiver 130 of FIG. 1. Further, according to an embodiment, the wireless communication module 1392 may include the transmitters 820, 920, 1020, and 1120, the observation receivers 830, 930, 1030, and 1130, and the receiver 840.

The antenna module 1397 may transmit or receive a signal or power to or from the outside (e.g., the external electronic device) of the electronic device 1301. According to an embodiment, the antenna module 1397 may include an antenna including a radiating element including a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in a communication network, such as the first network 1398 or the second network 1399, may be selected by, for example, the communication module 1390 from the plurality of antennas. The signal or the power may be transmitted or received between the communication module 1390 and the external electronic device via the at least one selected antenna. According to an embodiment, another component (e.g., a radio frequency integrated circuit (RFIC)) other than the radiating element may be additionally formed as a part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the external electronic devices 1302 or 1304 may be a device of the same type as or a different type from the electronic device 1301. According to an embodiment, all or some of operations to be executed by the electronic device 1301 may be executed at one or more of the external electronic devices 1302 and 1304, and the server 1308. For example, if the electronic device 1301 needs to perform a function or a service automatically, or in response to a request from a user or another device, the electronic device 1301, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In an embodiment, the external electronic device 1304 may include an Internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., the internal memory 1336 or the external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A communication device comprising:
   a transmitter configured to, in a first operation, distort an input signal through a digital predistortion (DPD) circuit, convert the distorted input signal into an analog signal, perform frequency up-conversion on the converted analog signal to generate a first signal, amplify the generated first signal through a power amplifier (PA), and couple the amplified first signal;
   a receiver configured to, in the first operation, receive the coupled first signal from the transmitter, perform frequency down-conversion on the coupled first signal to generate a second signal, and convert the generated second signal into a digital signal through one or more analog-to-digital converters (ADCs) that are turned on among a plurality of ADCs; and a processor configured to, in the first operation, cause one or more of the plurality of ADCs in the receiver to be turned on and a remainder of the plurality of ADCs to be turned off, wherein a number of ADCs to be turned on in the first operation is based on a memory order of a model that models a nonlinear characteristic of the PA.

2. The communication device of claim 1, wherein the DPD circuit is configured to distort the input signal according to a distortion function.

3. The communication device of claim 2, wherein the distortion function is a function determined based on an inverse of a model that models a first nonlinear characteristic of the PA due to a memoryless effect on an output of the PA, and one ADC is turned on in the first operation.

4. The communication device of claim 2, wherein the distortion function is a function determined based on an inverse of a model that models a second nonlinear characteristic of the PA due to a memory effect on an output of the PA, and a number of the plurality of ADCs to be turned on in the first operation is determined based on a memory order of the model.

5. The communication device of claim 1, wherein the processor is further configured to, in response to a change from the first operation to a second operation, cause each of the plurality of ADCs in the receiver to be turned on, and the receiver is further configured to, in the second operation, convert a signal received through an antenna into a digital signal through each of the plurality of ADCs.

6. The communication device of claim 1, wherein the processor is further configured to:

determine a predistortion parameter using the converted digital signal and the input signal, and control the DPD circuit using the determined predistortion parameter.

7. The communication device of claim 1, wherein the receiver operates as an observation receiver configured to observe the transmitter in the first operation.

8. The communication device of claim 1, wherein the plurality of ADCs are time-interleaved.

9. The communication device of claim 1, wherein the first operation mode is a DPD parameter update operation.

10. An operating method of a communication device, the operating method comprising:

causing one or more of a plurality of analog-to-digital converters (ADCs) in a receiver to be turned on and a remainder of the plurality of ADCs to be turned off;

distorting an input signal through a digital predistortion (DPD) circuit;

converting the distorted input signal into an analog signal;

performing frequency up-conversion on the converted analog signal to generate a first signal;

amplifying the generated first signal through a power amplifier (PA);

coupling the amplified first signal;

performing frequency down-conversion on the coupled first signal to generate a second signal; and converting the generated second signal into a digital signal through the turned-on one or more ADCs, wherein a number of ADCs to be turned on in the first operation is based on a memory order of a model that models a nonlinear characteristic of the PA.

11. The operating method of claim 10, wherein the DPD circuit is configured to distort the input signal according to a distortion function.

12. The operating method of claim 11, wherein the distortion function is a function determined based on an inverse of a model that models a first nonlinear characteristic of the PA due to a memoryless effect on an output of the PA, and one ADC of the plurality of ADCs is caused to be turned on.

13. The operating method of claim 11, wherein the distortion function is a function determined based on an inverse of a model that models a second nonlinear characteristic of the PA due to a memory effect on an output of the PA, and a number of the plurality of ADCs to be caused to be turned on is determined based on a memory order of the model.

14. The operating method of claim 10, further comprising:

determining a predistortion parameter using the converted digital signal and the input signal; and controlling the DPD circuit using the determined predistortion parameter.

15. The operating method of claim 10, wherein the one or more of the plurality of analog-to-digital converters (ADCs) in a receiver are turned on and the remainder of the plurality of ADCs are turned off in a digital predistortion (DPD) parameter updated operation.

* * * * *